United States Patent
Werner et al.

(10) Patent No.: US 11,277,353 B2
(45) Date of Patent: *Mar. 15, 2022

(54) DELIVERY OF MULTIMEDIA COMPONENTS ACCORDING TO USER ACTIVITY

(71) Applicant: Comcast Cable Communications, LLC, Philadelphia, PA (US)

(72) Inventors: Anthony Werner, Castle Rock, CO (US); Weidong Mao, West Windsor, NJ (US); Sree Kotay, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,298

(22) Filed: Feb. 26, 2018

(65) Prior Publication Data

US 2019/0036838 A1  Jan. 31, 2019

Related U.S. Application Data

(63) Continuation of application No. 13/804,141, filed on Mar. 14, 2013, now Pat. No. 9,948,573.

(51) Int. Cl.
*H04N 7/173* (2011.01)
*G06F 13/00* (2006.01)
(Continued)

(52) U.S. Cl.
CPC ........ *H04L 47/801* (2013.01); *H04L 65/1069* (2013.01); *H04L 65/4084* (2013.01);
(Continued)

(58) Field of Classification Search
CPC ....... H04L 47/801; H04L 65/80; H04L 67/24; H04L 65/4084; H04L 65/4092;
(Continued)

(56) References Cited

U.S. PATENT DOCUMENTS 6,230,200 B1 * 5/2001 Forecast .................. G06F 9/50
709/219
6,577,324 B1 * 6/2003 Palmer ................ G06F 3/04847
348/E7.081
(Continued)

FOREIGN PATENT DOCUMENTS

EP             618728 A2 *  3/1994

OTHER PUBLICATIONS

Extended European Search Report—EP 14159451.5—dated Sep. 17, 2014.
(Continued)

*Primary Examiner* — Kevin T Bates
*Assistant Examiner* — Golam Mahmud
(74) *Attorney, Agent, or Firm* — Banner & Witcoff, Ltd.

(57) ABSTRACT

Systems, methods, apparatuses, and computer readable media may be configured for establishing at least one session for delivery of multimedia. In an aspect, a first transmission of data fragments of a first component and a second transmission of data fragments of a second component may be transmitted and synchronized for presentation. If an inactivity event is detected the session may be maintained while reducing bandwidth consumption.

32 Claims, 6 Drawing Sheets

(51) Int. Cl.
  *H04L 47/80* (2022.01)
  *H04L 65/1069* (2022.01)
  *H04L 65/612* (2022.01)
  *H04L 67/54* (2022.01)
  *H04L 65/613* (2022.01)
  *H04L 65/80* (2022.01)
  *H04N 21/431* (2011.01)
  *H04N 21/442* (2011.01)
  *H04N 21/462* (2011.01)
  *H04N 21/6373* (2011.01)
  *H04N 21/845* (2011.01)

(52) U.S. Cl.
  CPC .......... *H04L 65/4092* (2013.01); *H04L 65/80* (2013.01); *H04L 67/24* (2013.01); *H04N 21/4312* (2013.01); *H04N 21/44218* (2013.01); *H04N 21/4621* (2013.01); *H04N 21/6373* (2013.01); *H04N 21/8456* (2013.01)

(58) Field of Classification Search
  CPC ............ H04L 65/1069; H04N 21/8456; H04N 21/6373; H04N 21/4312; H04N 21/4621; H04N 21/44218
  USPC ............................................. 709/224
  See application file for complete search history.

(56) References Cited

U.S. PATENT DOCUMENTS

| | | | | |
|---|---|---|---|---|
| 6,763,379 | B1* | 7/2004 | Shuster | G06Q 30/0264 709/219 |
| 7,240,355 | B1* | 7/2007 | Eldering | H04N 21/2353 348/E5.002 |
| 7,873,074 | B1* | 1/2011 | Boland | H04L 47/823 370/468 |
| 8,006,275 | B1* | 8/2011 | Poole | H04N 21/4425 725/96 |
| 8,266,314 | B2* | 9/2012 | Bhogal | H04L 65/604 709/231 |
| 8,543,723 | B2* | 9/2013 | Iwamura | H04L 47/18 709/233 |
| 8,843,153 | B2* | 9/2014 | Luna | H04W 48/18 455/453 |
| 8,862,763 | B2* | 10/2014 | Adi | H04N 21/8456 709/231 |
| 9,077,763 | B2* | 7/2015 | Simongini | H04L 67/18 |
| 9,485,686 | B2* | 11/2016 | Gundu | H04L 65/4061 |
| 9,699,489 | B2* | 7/2017 | Iwamura | H04L 47/10 |
| 2002/0144153 | A1* | 10/2002 | LeVine | G06F 21/14 726/33 |
| 2003/0067554 | A1* | 4/2003 | Klarfeld | H04N 21/26283 348/461 |
| 2003/0074673 | A1* | 4/2003 | Nomura | H04N 21/4113 725/114 |
| 2004/0261112 | A1* | 12/2004 | Hicks, III | H04N 21/8352 725/89 |
| 2005/0190794 | A1* | 9/2005 | Krause | H04N 7/17336 370/485 |
| 2006/0026295 | A1* | 2/2006 | Iwamura | H04L 47/10 709/233 |
| 2006/0031484 | A1* | 2/2006 | O'Neill | H04L 67/24 709/224 |
| 2006/0225106 | A1* | 10/2006 | Bedingfield | H04N 21/2343 725/95 |
| 2007/0047901 | A1* | 3/2007 | Ando | G11B 27/34 386/241 |
| 2007/0260634 | A1* | 11/2007 | Makela | G11B 27/28 |
| 2008/0200154 | A1* | 8/2008 | Maharajh | G06Q 30/0244 455/414.3 |
| 2008/0212471 | A1* | 9/2008 | Jowett | H04L 65/608 370/231 |
| 2008/0290987 | A1* | 11/2008 | Li | G06Q 30/02 340/5.1 |
| 2009/0204719 | A1* | 8/2009 | Simongini | H04L 67/24 709/231 |
| 2009/0276633 | A1* | 11/2009 | Silverbrook | H04M 1/72445 713/176 |
| 2010/0129050 | A1* | 5/2010 | Alexander | H04N 21/25816 386/343 |
| 2010/0161761 | A1* | 6/2010 | Yu | H04N 21/2402 709/219 |
| 2010/0254673 | A1* | 10/2010 | Begen | H04N 7/17318 386/239 |
| 2010/0313250 | A1* | 12/2010 | Chow | H04L 63/08 726/5 |
| 2011/0088054 | A1* | 4/2011 | Malik | G10L 15/26 725/29 |
| 2011/0106963 | A1* | 5/2011 | Lee | H04L 65/602 709/231 |
| 2011/0197223 | A1* | 8/2011 | Ravula | H04N 21/4882 725/33 |
| 2011/0222549 | A1* | 9/2011 | Connelly | G06F 8/65 370/401 |
| 2011/0295980 | A1* | 12/2011 | Aldis | H04L 65/4084 709/219 |
| 2011/0305170 | A1* | 12/2011 | Lai | H04L 47/15 370/261 |
| 2012/0170666 | A1* | 7/2012 | Venkatasubramanian | H04N 19/436 375/240.25 |
| 2013/0007831 | A1* | 1/2013 | Wu | H04L 65/4084 725/116 |
| 2013/0070839 | A1* | 3/2013 | Magee | H04L 65/80 375/240.02 |
| 2013/0179541 | A1* | 7/2013 | Chen | H04L 65/608 709/219 |
| 2013/0232532 | A1* | 9/2013 | Shida | H04L 47/25 725/95 |
| 2014/0181312 | A1* | 6/2014 | Rutten | H04L 67/10 709/227 |
| 2014/0201766 | A1* | 7/2014 | Stepanov | H04N 21/4755 725/9 |
| 2015/0055573 | A1* | 2/2015 | Miklos | H04L 65/80 370/329 |
| 2015/0193061 | A1* | 7/2015 | Stekkelpak | G06F 3/165 715/716 |

OTHER PUBLICATIONS

Response to EP Written Opinion of International Search Authority—EP 14159451.5—dated Apr. 9, 2015.
Apr. 14, 2020—Canadian Office Action—CA 2,845,987.

* cited by examiner

DELIVERY OF MULTIMEDIA COMPONENTS ACCORDING TO USER ACTIVITY

CROSS-REFERENCE TO RELATED APPLICATIONS

The present application is a continuation of U.S. patent application Ser. No. 13/804,141, filed Mar. 14, 2013 and entitled "Delivery of Multimedia Components According to User Activity," which is hereby incorporated by reference in its entirety.

BACKGROUND

Consumers are increasingly demanding rich multimedia content that requires distribution of a large amount of data over a network. Multimedia content may provide consumers with video content, audio content, and data content. Multimedia content is typically delivered as a composite asset that includes video, audio, and data.

Existing systems can be wasteful of bandwidth resources, for example, delivering portions of the multimedia content that a consumer does not desire to receive (e.g., audio in a language the consumer does not speak), or delivering multimedia content almost indefinitely, unless a consumer takes some affirmative action to end delivery. Transporting of undesired or unneeded content is wasteful, and may result in degraded performance.

Accordingly, there remains a need to improve bandwidth utilization, and to balance user demands for multimedia content against network performance.

SUMMARY

The following presents a simplified summary in order to provide a basic understanding of some aspects as described herein. The summary is not an extensive overview of all aspects. It is neither intended to identify key or critical elements nor to delineate the scope of the present disclosure. The following summary merely presents various example concepts in a simplified form as a prelude to the more detailed description below.

In some embodiments, systems, methods, apparatuses, and computer readable media may be configured for establishing at least one session for delivery of multiple components of a multimedia content item. For example, first and second transmissions of data fragments corresponding to first and second components, may be received, synchronized, and presented for rendering of the multimedia content item. An inactivity event may be identified subsequent to the rendering; and, subsequent to the identifying of the inactivity event, a session may be maintained in an active state. In some examples, delivery of a first transmission of data fragments may be stopped, or a lower bandwidth version of the first component may be requested and/or provided.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
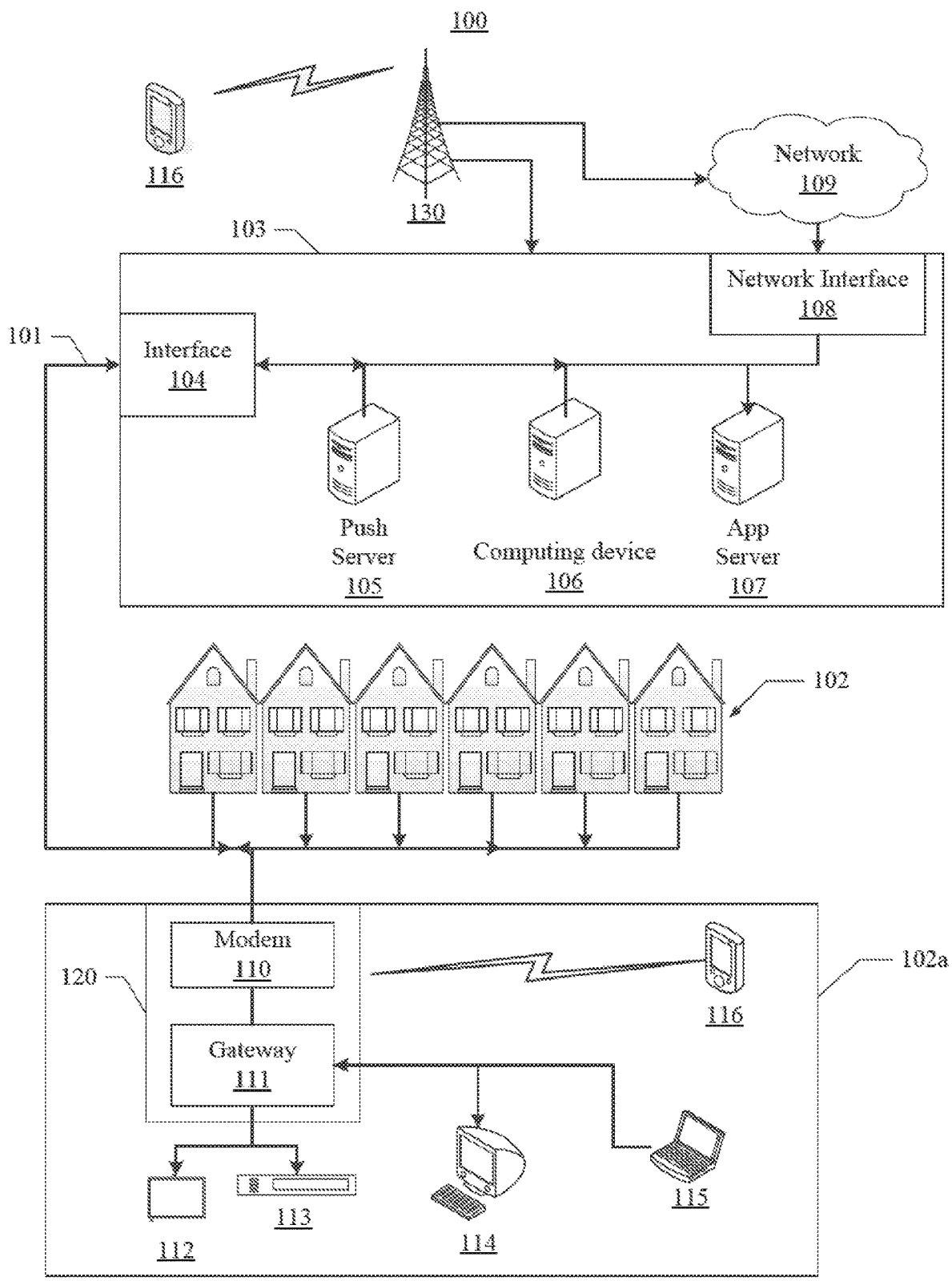
FIG. 1 illustrates an example network environment.

FIG. 1 illustrates an example information distribution network 100 in which many of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

Network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other type of information distribution network or combination of networks. For example, network 100 may be a cellular broadband network communicating with multiple communications access points, such as wireless communications tower 130. In another example, network 100 may be a coaxial system comprising a cable modem termination system (CMTS) communicating with numerous gateway interface devices (e.g., gateway interface device 111 in example home 102a). In another example, the network 100 may be a fiber-optic system comprising optical fibers extending from an optical line terminal (OLT) to numerous optical network terminals (ONTs) communicatively coupled with various gateway interface devices. In another example, the network 100 may be a digital subscriber line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

Network 100 may use a series of interconnected communication links 101 (e.g., coaxial cables, optical fibers, wireless links, etc.) to connect premises such as homes 102 or other user environments to local office 103. Communication links 101 may include any wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other components for communicating data. Data may include, for example, internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

Local office 103 may transmit downstream information signals onto communication links 101, and premises such as home 102 may receive and process those signals. In certain implementations, communication links 101 may originate from local office 103 as a single communications path, and may be split into any number of communication links to distribute data to homes 102 and various other destinations. Although the term home is used by way of example, homes 102 may include any type of user environment, such as single family homes, apartment complexes, businesses, schools, hospitals, parks, and other environments and combinations of environments.

Local office 103 may include interface 104, which may be a computing device configured to manage communications between devices on the network of communication links 101 and backend devices, such as server 105, computing device 106 (e.g., server), and server 107. For example, interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in homes 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks.

Local office 103 may include a variety of servers that may be configured to perform various functions. Local office 103 may include one or more push servers 105 for generating push notifications to deliver data, instructions, or both to devices that are configured to detect such notifications. Local office 103 may include one or more servers 106 configured to provide content (e.g., media content) to devices. Computing device 106 may be a network server or content server storing content items. Local office 103 may include one or more application servers 107.

Homes 102 such as home 102a may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other device or combination of devices. In certain implementations, device 110 may be a part of, or communicatively coupled to, gateway interface device 111. Gateway 111 may be, for example, a wireless router, a set-top box, a computer server, or any other computing device or combination.

Gateway interface device 111 may be any computing device for communicating with device 110 to allow one or more other devices in example home 102a to communicate with local office 103, one or more external networks 109, or other devices communicatively coupled thereto. Gateway 111 may include local network interfaces to provide communication signals to client devices in or near example home 102a, such as television 112, set-top box 113, personal computer 114, laptop computer 115, wireless device 116 (e.g., a wireless laptop, a tablet computer, a mobile phone, a portable gaming device), vehicular computing system 117 (e.g., a mobile computing system, navigation system, or entertainment system in an automobile, marine vessel, or aircraft) and any other device.

Figure 2:
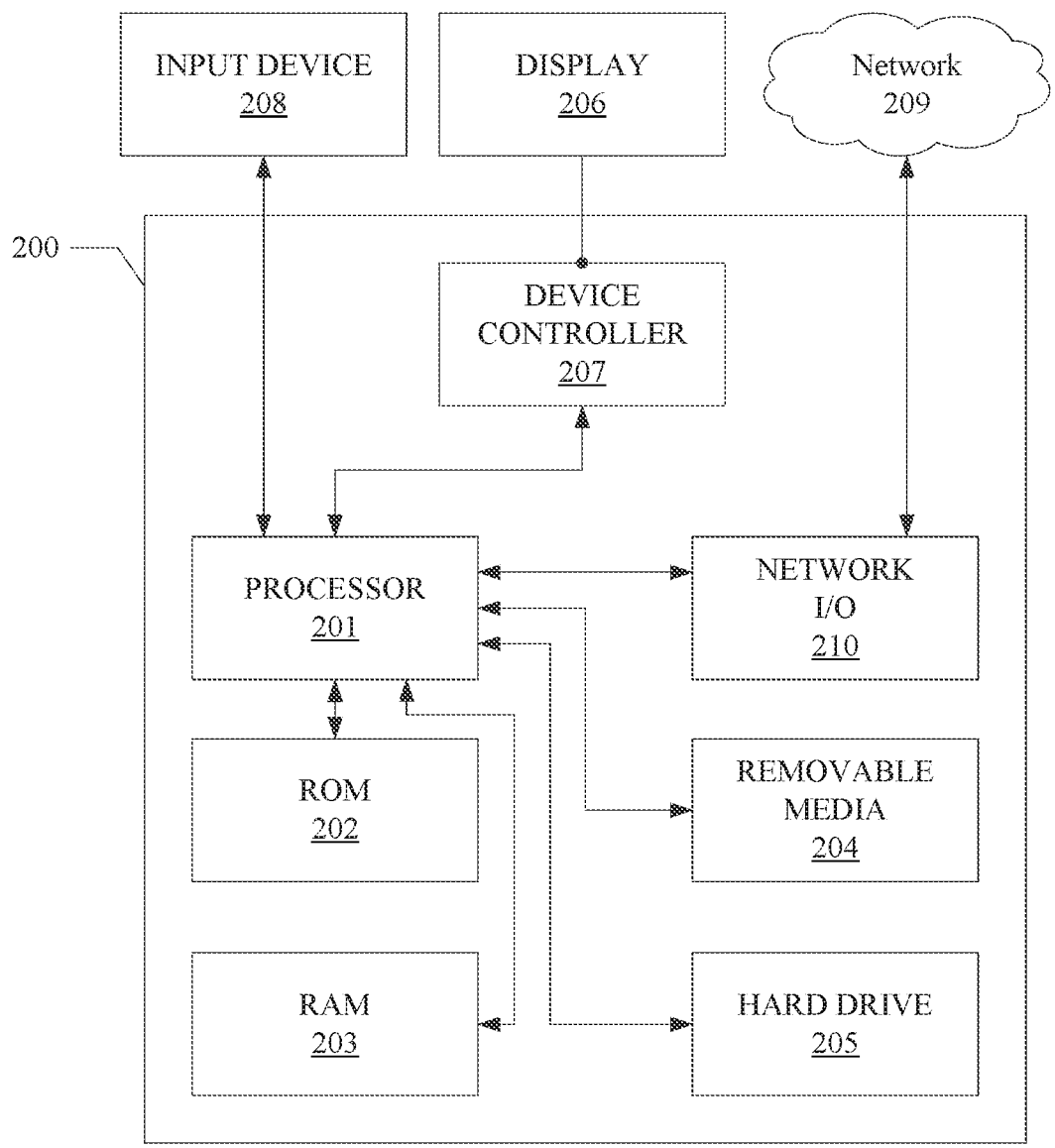
FIG. 2 illustrates example computing device on which various elements described herein can be implemented.

FIG. 2 illustrates general hardware elements and software elements that can be used to implement any of the various computing devices and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

Device 200 may include one or more output devices, such as a display 206, such as an external monitor or television, and may include one or more output device controllers 207, such as a video processor. In some embodiments, device 200 may include one or more user input devices 208, such as a remote control, keyboard, mouse, touch screen, microphone, or any other input device.

Device 200 may also include one or more network interfaces, such as network input/output (I/O) interface 210 to communicate with an external network 209. The network interface may be a wired interface, wireless interface, or a combination of the two. In some embodiments, network I/O interface 210 may include a cable modem, and network 209 may include the communication links 101 shown in FIG. 1, one or more external networks 109, an in-home network, a provider's wireless, coaxial, fiber, or hybrid fiber/coaxial distribution system (e.g., a DOCSIS network), or any other desired network.

Figure 3:
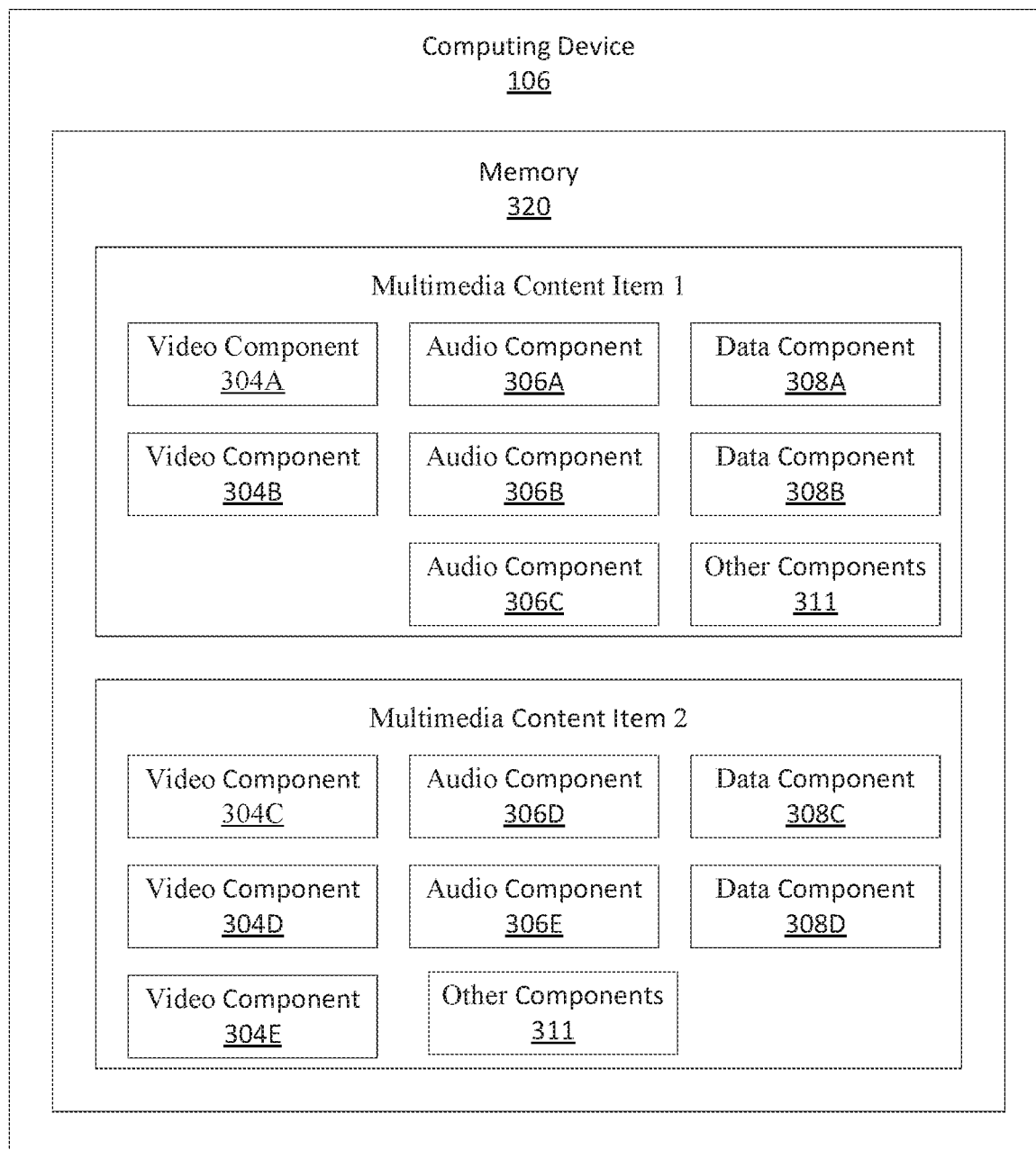
FIG. 3 illustrates example aspects of a computing device for processing discrete components in accordance with example embodiments.

FIG. 3 illustrates example aspects of computing device 106 storing multimedia content items as discrete components in accordance with example embodiments. Computing device 106 may include a memory 320 for storing one or more multimedia content items. A multimedia content item may be a compilation of components, such as, for example, audio, video and ancillary data.

Each multimedia content item may be stored as discrete components, rather than as a single asset. For example, a multimedia content item may include multiple video components 304, multiple audio components 306, multiple data components 308, and other components 311. In an embodiment, other components 311 may be signals, messages, or other envisioned or future developed data. Each video component 304 may correspond to a different version of video for the multimedia content item. For example, a first version may be high definition (HD) video, a second version may be a left eye view for three dimensional (3D) video, a third version may be a right eye view for three dimensional (3D) video, and a fourth version may be standard definition video. Video components may also be different formats of video, where a first component may be a large version of video and a second version may be a small-format or thumbnail version. In an example, small-format versions may be used for presenting a mosaic of the video using multiple display screens, where each screen presents a different portion of full-screen video. In the example shown in FIG. 3, memory 320 stores multimedia content items 1 and 2. Multimedia content item 1 includes video components 304A-B, and multimedia content item 2 includes video components 304C-E.

Each audio component 306 may correspond to a different version of audio for a multimedia content item. For example, if the multimedia content item is of a sporting event, a first version may be audio of a home team's television announcer, a second may be audio of a home team's radio announcer, a third version may be audio of a visiting team's television announcer, and a fourth version may be audio of a visiting team's radio announcer. In another example, a first version of audio may correspond to a left channel and a second version may correspond to a right channel, and so forth. Audio components may also correspond to different languages. In the example shown in FIG. 3, multimedia content item 1 includes audio components 306A-C, and multimedia content item 2 includes audio components 306D-E.

Each data component 308 may include data provided from one or more sources. A data component may, for example, support interactive applications, alternate languages, closed captioning, etc. For example, a first data component may include real-time statistics of a sporting event, a second data component may include closed captioning text, a third data component may include comments posted on a social networking website, a fourth data component may include data streamed from a webserver (e.g., real-time stock quotes). In the example shown in FIG. 3, multimedia content item 1 includes data components 308A-B, and multimedia content item 2 includes data components 306C-D.

Figure 4:
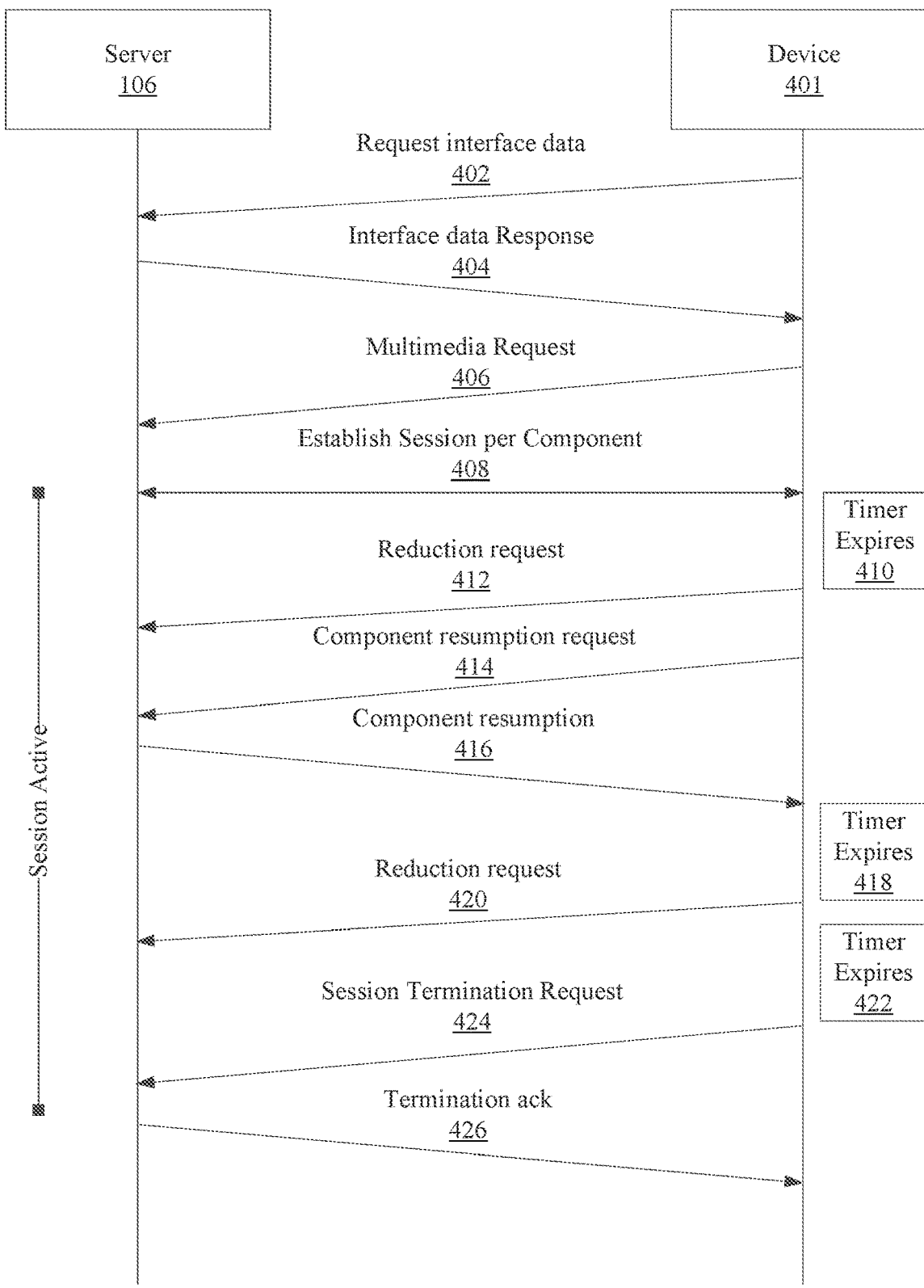
FIG. 4 illustrates an example signaling diagram of communications in accordance with example embodiments.

To provide a multimedia content item, computing device 106 may establish a session with device 110 (or device 401, FIG. 4). Device 110 may forward data fragments received via the session to an end user device, such as, for example, television 112, wireless device 116, for presentation to the user. Device 110 may also be the end user device, or may be integrated into the end user device. The following describes device 110 as being the end user device, however the functionality below attributed to device 110 may be divided between device 110 and at least one other device (e.g., wireless device 116).

A session may transport multiple transmissions (e.g. multiple streams) of data fragments, where each transmission corresponds to one component. By separating multimedia content items into discrete components, computing device 106 may establish one transmission per component, thereby only delivering desired components of the multimedia content item. This may result in savings of bandwidth, and may permit computing device 106 to halt sending of a transmission for a particular component, or sending a lower bandwidth version, if inactivity is detected. Further, separating multimedia content items into discrete components advantageously permits a single multimedia content item to be stored on, and delivered from, multiple servers 106. Data fragments of each component may include synchronization information to permit synchronizing of the video, audio, and data upon receipt.

FIG. 4 illustrates an example signaling diagram of communications between computing device 106 and device 401 in accordance with example embodiments. Device 401 may be an interface 120 or another device such as an end-user device (e.g. device 110). Device 401 may communicate a request 402 that requests interface data such as graphical user interface (GUI) data, or application program interface data from computing device 106. The interface data may indicate available multimedia content items, as well as the components associated with each item. Computing device 106 may respond with a response message 404 that includes the interface data. In other examples, computing device 106 may periodically communicate the interface data and device 401 may tune to a particular channel, decode a particular data transmission, etc., to receive the interface data. Subsequent to receiving the GUI data, device 401 may process the GUI data and present a multimedia interface. A device other than device 401 (e.g., wireless device 116) may display the multimedia interface instead of or in addition to device 401.

Figure 5:
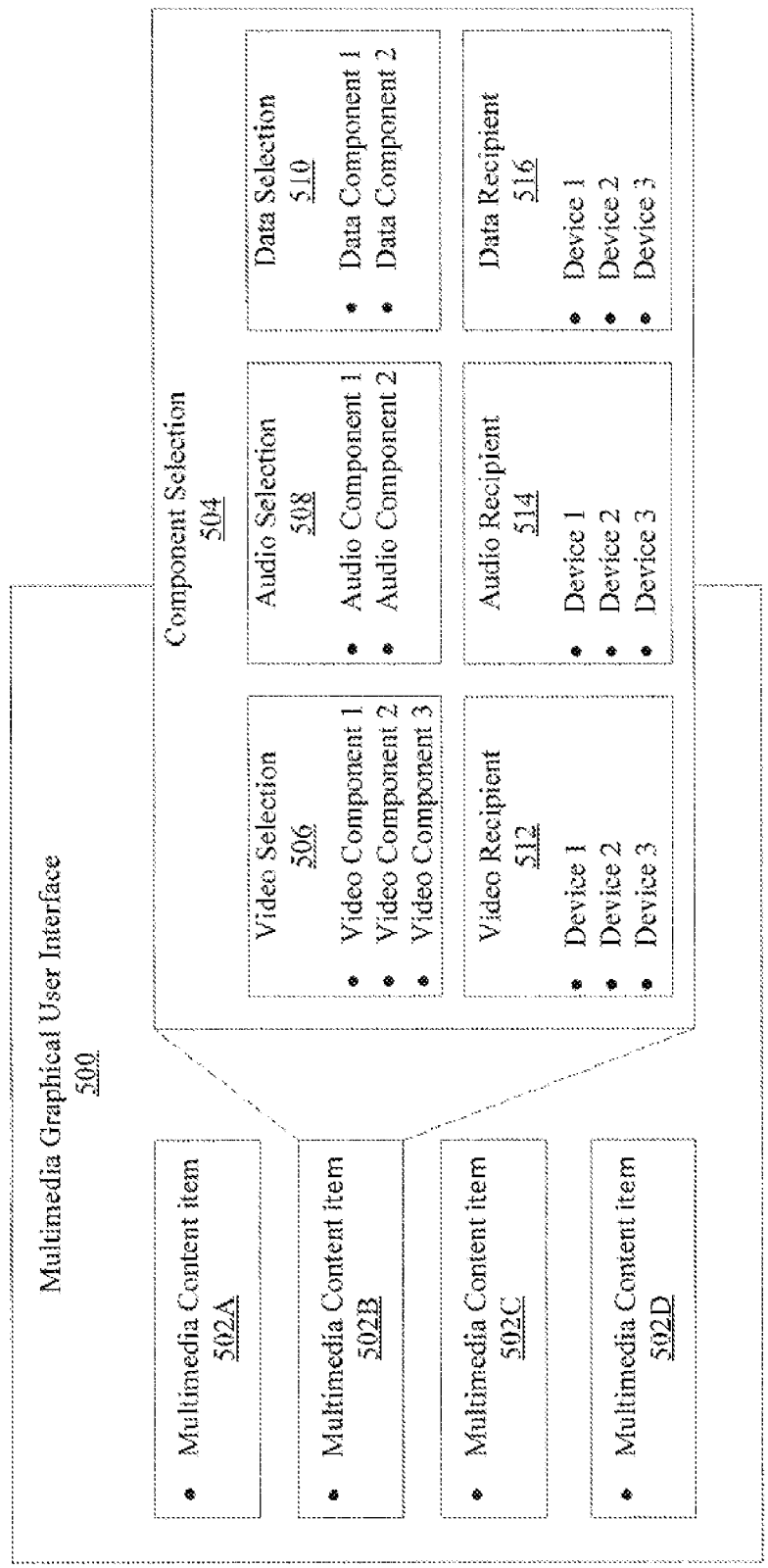
FIG. 5 illustrates an example multimedia interface in accordance with example embodiments.

FIG. 5 illustrates an example multimedia interface such as a multimedia graphical user interface in accordance with example embodiments. Multimedia GUI 500 may present one or more multimedia content items 502A-D that are available for presentation. Different users may want versions of a multimedia content item, and some may need no more than a subset of the components. Multimedia GUI 500 may assist the user is selecting which components of a multimedia content item are desired.

Upon selection of a particular multimedia content item, multimedia GUI 500 may present components available for selection. In example, user may provide input to device 401 to select multimedia content item 502B. Multimedia GUI 500 may then display component selection field 504. Component selection field 504 may permit selection between one or more video components in field 506, audio components in field 508, and data components in field 510 associated with the selected multimedia content item. More than one component may be selected within each of fields 506, 508, and 510. For example, a user may select both video component 1 and video component 2 in video selection field 506. Component selection field 504 may also permit selection in fields 512, 514, and 516 of what device is to receive each of the selected components. For example, a user may select to have video component 1 provided to first and second devices, video component 2 provided to a third device, and not to have video component 3 provided to any device. In another example, a user may select to only receive audio component 1, and not to receive any of the video components or data components. A user may also revise their selections in Multimedia GUI 500 over time. For example, a user may initially select English audio, and midway through presentation of the multimedia content item, may change the selection to be Spanish audio.

In an example with reference to FIGS. 1 and 5, Multimedia GUI 500 may be presented by laptop computer 115 that receives GUI data forwarded from device 401 via gateway 111. Using an input device of laptop computer 115, a user may select to have video component 1 provided to television 112 and laptop computer 115, video component 2 provided to wireless device 116, and not to have video component 3 provided to any device. For instance, television 112 may present 3D HD video and laptop computer 115 may present standard definition video. A user may select to have audio component 1 provided to laptop computer 115 and audio component 2 provided to wireless device 116. For instance, laptop computer 115 may present English audio and wireless device 116 may present Mandarin audio. A user may select to have data component 1 provided to laptop computer 115, and not to have data component 2 provided to any device.

Referring again FIG. 4, device 401 may communicate a multimedia request 406 to computing device 106 based on selections received using multimedia GUI 500. Multimedia request 406 may include a listing of identifiers of the selected components. For example, request 406 may identify only a single audio component, or, for 3D high definition (HD), may identify a video component, an advanced audio component, and audio components for multiple languages.

Subsequent to receiving request 406, computing device 106 may then communicate with device 401 to establish a session. Computing device 106 may include, for example, a session resource manager (SRM). Each session may transport one or more data transmissions. For example, if a user selected two video components and one audio component, computing device 106 may establish a session to transport three data transmissions. To establish a session, computing device 106 may communicate a network location from which device 401 is to obtain a component. The network location may be a network address of a device other than the computing device 106, to permit establishing of sessions with multiple servers 106 that collectedly provide components of a single multimedia content item. The components may be available from multiple locations to enable efficient use of storage and network transmission resources.

After a session is established, device 401 may receive transmissions of data fragments for each of the components. A data fragment may be a packet, a cell, a frame, or other manner of transporting a portion of data from a source to a destination over a network. Each data fragment may include synchronization information and a transmission identifier. For example, fragments of each of the audio, video, and data components may include synchronization information specifying a time stamp. Device 401 may reassemble the components for presentation based on data fragments of the different components having a time stamp that includes a common value. Device 401 may also cache a predetermined amount of data prior to presentation to reduce any issues with latency, problems with a network transmission path delivering data from computing device 106 to device 401, and to allow for inter-fragment skew when the fragments are being synchronized for presentation.

The transmission identifier may identify to which transmission a data fragment belongs. For example, if a session transports a video transmission, an audio transmission, and a data transmission, the video transmission may have a first identifier, the audio transmission may have a second identifier, and the data transmission may have a third identifier. Device 401 may use the transmission identifier to distinguish between the transmissions. By transporting only the components the user requests, the amount of bandwidth used to transport the multimedia content item may be reduced.

To efficiently use network bandwidth, device 401 (or other device, e.g., laptop computer 115) may monitor for inactivity events while presenting the multimedia content item. An inactivity event may be a determination that a user is not viewing or not listening to the multimedia content item currently being provided, or that the user is using the device 401 to do something besides viewing or listening to the multimedia content item. In an example, device 401 may include an activity timer for monitoring activity within a predetermined amount of time and may identify an inactivity event at the expiration of the timer. Device 401 may reset the timer each time that a reset trigger is identified. Example reset triggers may include a user responding to a prompt generated by the multimedia content item, changing a volume setting, etc. Device 401 may be controlled by a remote control. The remote control may include an accelerometer (or other motion detection sensor) to determine user presence and activity. Device 401 may periodically receive motion data from the remote control and, if the data indicates a predetermined amount of motion, device 401 identify such movement as an activity event and reset the timer. Device 401 may also be coupled to other types of motion detectors (e.g., infrared, laser, etc.) to determine user presence and activity. Additional activities may include program selection or a change in a setting such as a channel setting.

When multiple devices are being used to present a multimedia content item, activity detected at any of the devices may be used reset the activity timer. For example, and with reference to FIG. 1, a video component may be presented by a wireless device 116 and by laptop computer 115. Laptop computer 115 may detect activity and communicate activity data to device 401 that resets the activity timer. Activity timer may be implemented at device 401 or at other devices, such as laptop computer 115, desktop computer 114, wireless device 116, etc.

Device 401 may also warn the user that the activity timer is about to expire at a predetermined amount of time before expiration. To warn the user that the activity timer is about to expire, device 401 may present a pop-up window, play an audible warning, display a light, cause a device to vibrate, etc., or otherwise notify the user of the pending expiration. Messages may also be arranged serially to provide an early warning, then final warning of an impending bandwidth management action. When multiple devices are synchronized and presenting the multimedia content item, messages may be sent to any or all of the participating devices to verify there is an active user. For example, with reference to FIG. 1, a video component may be presented by a wireless device 116 and by laptop computer 115. A warning message may be presented at one or both of wireless device 116 and laptop computer 115. Warning messages may also be sequentially sent to devices in a particular order. For example, messages may first be sent to handheld wireless device 116 before being presented as a pop up on television 112.

With reference again to FIG. 4, in block 410, device 401 may identify expiration of the activity timer as an inactivity event and then communicate a reduction request 412 to computing device 106. Request 412 may instruct computing device 106 to halt delivery of one or more transmission transporting data fragments for one or more of the components, or to send a lower bandwidth version. For example, request 412 may instruct computing device 106 to stop sending fragment data for the video component and the data component, but to continue sending fragment data for the audio component. In another example, request 412 may instruct computing device 106 to send a lower bandwidth version of some or all of the components. For example, computing device 106 may send a standard definition version of a video component instead of a high definition version or a 3D version. In another example, lower bandwidth versions may also include screen shots instead of video, a smaller window, etc. In another example, computing device 106 may only send fragments of the data component (e.g., closed captioning information) instead of audio and video components. As such, computing device 106 and device 401 may autonomously scale back the bandwidth used for a particular session while attempting to avoid an unsatisfactory user experience.

In other example aspects, device 401 may identify an inactivity event based on user action suggesting lack of interest in a multimedia content item being presented. For example, device 401 may be presenting a multimedia content item in a first GUI. If a user causes a second GUI to obscure at least a predetermined amount of the first GUI, device 401 may identify this action as an inactivity event. Device 401 may also initiate activity timer upon detecting that the at least a predetermined amount of the first GUI has been obscured. If the timer expires, device 401 may identify an inactivity event. Subsequent to identifying an inactivity event, device 401 may communicate reduction request 412 to instruct computing device 106 to halt sending of data fragments of the video component, or to send a reduced bandwidth version.

In further example aspects, device 401 may identify an inactivity event based on monitoring whether an external device (e.g., external display monitor) presenting a component has been turned off. If device 401 determines that the external device has been turned off, device 401 may identify this action as an inactivity event. Device 401 also may initiate activity timer upon detecting that the external device has been turned off. If the timer expires, device 401 may identify an inactivity event. Subsequent to identifying an inactivity event, device 401 may communicate reduction request 412 to instruct computing device 106 to halt sending of data fragments of the component being presented by the external device.

Computing device 106 may also monitor network conditions between device 401 and computing device 106 to determine whether to stop sending components to device 401, or whether to send reduced bandwidth versions of certain components. For example, computing device 106 may include a bandwidth utilization detector to monitor current bandwidth utilization relative to total available utilization. Computing device 106 may compare current bandwidth utilization to one or more predetermined thresholds. If current bandwidth utilization exceeds a particular predetermined threshold, computing device 106 may identify a component requiring the greatest amount of bandwidth for delivery, and may halting sending that component or may provide a lower bandwidth version of that component. Upon the current bandwidth utilization falling below the particular predetermined threshold, computing device 106 may resume sending the higher bandwidth version.

Even though computing device 106 may halt sending one or more transmissions of data fragments for one or more components, computing device 106 may keep the session active with device 401. In an example, computing device 106 may halt sending of a transmission of video data fragments via the session, but may maintain the session in an active state. For example, at active state may indicate that computing device 106 has reserved a predetermined amount of network bandwidth, even though computing device 106 is no longer communicating a transmission of data fragments for a particular component. Keeping the session active may permit faster resumption of sending data fragments to the device, as compared to having to re-establish the session.

When resumption of a transmission is desired, device 401 may communicate a component resumption request 414 to computing device 106 identifying the corresponding component. For example, computing device 106 may have halted transmission of a transmission of data fragments for a video component, and device 401 may request that the transmission be restored. Device 401 may communicate the resumption request 414 in response to identifying an activity event. An activity event may be input provided by the user and/or may be detected by device 401. In an example, device 401 may detect an activity event based on user presence, activity, a device being turned back on, etc. For example, device 401 may have instructed computing device 106 to halt sending of a component due to an external device being turned off. Device 401 may detect that the external device has been turned back on, and then may communicate the resumption request 414. In another example, device 401 may detect user movement and/or presence using a motion detection sensor, an accelerometer, etc., and then communicate request 404. In a further example, device 401 may determine that a GUI in which a video component is being presented is no longer obscured by a second GUI, and may then communicate request 404. In response to receiving request 414, computing device 106, at block 416, may resume sending a transmission of data fragments to the device 401 for the corresponding component.

Upon resumption, computing device 106 may send data fragments of the component based on a current location in time within the multimedia content item. For example, computing device 106 may have halted sending of video data fragments, but continued to communicate audio data fragments. Computing device 106 may determine a current time stamp of the audio data fragments being sent and send the video data fragments having the current and subsequent time stamps.

In another example, computing device 106 may resume sending data fragments for all of the components based on the time at which the activity timer expired. This may permit the user to resume viewing or listening to the multimedia content item from the time he or she may have stopped being able to do so. For example, a multimedia content item may be thirty minutes long and the activity timer expired thirteen minutes into the content. Computing device 106 may resume sending data fragments for all of the components at the thirteen minute mark. Computing device 106 may also resume sending data fragments a predetermined amount of time before the activity timer expired, such as, for example, at a last time the activity timer was reset. The user may also use device 401 to specify the time at which to resume sending data fragments.

With reference again to FIG. 4, at some time the activity timer may expire at device 401 may communicate component halt request 420 to computing device 106. Subsequent to activity timer expiring, device 401 may reset the activity timer to determine whether to terminate a session. If an activity event is identified, device 401 may reset the activity timer and optionally may communicate a resumption request 414. If an activity event is not identified prior to the activity timer expiring, device 401 may then initiate termination of a session. As discussed above, an activity event may be input provided by the user and/or may be detected by device 401. Device 401 may also present a warning, similar to the discussion provided above, that the session is about to be terminated at a predetermined amount of time prior to expiration of the timer. Subsequent to the timer expiring in block 422, device 401 may communicate a session termination request 424 to computing device 106. Computing device 106 may receive and process request 424, and respond with a termination acknowledgement message 426 to indicate that the session has been terminated. Computing device 106 and device 401 may later re-establish a terminated session, but doing so may require a greater amount of time as compared to resuming sending of a transmission of data fragments on an active session.

Figure 6:
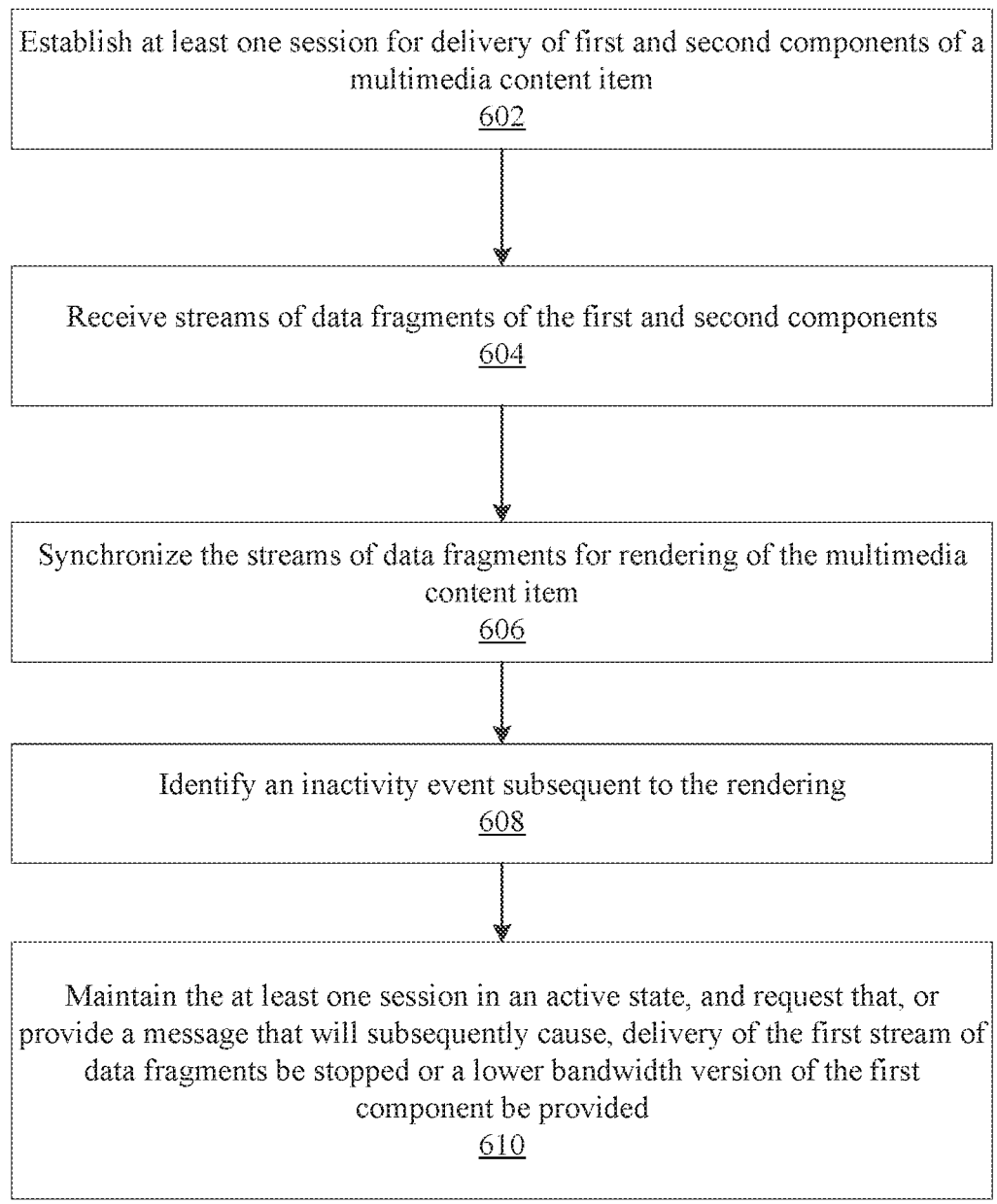
FIG. 6 illustrates a flow diagram of an example method of controlling bandwidth usage in accordance with example embodiments of the disclosure.

FIG. 6 illustrates a flow diagram of an example method of managing, e.g. controlling, bandwidth usage in accordance with example embodiments of the disclosure. FIG. 6 may be implemented by a computer, such as, for example, device 401, or other apparatus such as a network or user computing device, (e.g. computer, server, wired or wireless user device, etc.). Some steps of the example method may be performed by a network device, while others are performed by a local user device. The order of the steps shown in FIG. 6 may also be rearranged, additional steps may be included, some steps may be removed, and some steps may be repeated one or more times. The method may be stored on at least one non-transitory computer readable medium as computer executable instructions that, when executed by at least processor, cause an apparatus to perform the method. The method may begin at block 602.

At block 602, the method may include establishing at least one session for delivery of at least a first component and a second component of a multimedia content item. At block 604, the method may include receiving, during the at least one session, a first transmission of data fragments of the first component and a second transmission of data fragments of the second component. The transmissions may be a stream, file based, or any other type of transmission. At block 606, the method may include synchronizing the first transmission of data fragments and the second transmission of data fragments, and presenting the synchronized data fragments for rendering of the multimedia content item. At block 608, the method may include identifying an inactivity event subsequent to the rendering. At block 610, the method may include, subsequent to the identifying of the inactivity event, maintaining the at least one session in an active state and performing one of: requesting that delivery or providing a message that subsequently causes the first transmission of data fragments be stopped, or requesting delivery of a lower bandwidth version of the first component. The method may then end, or may return to any of the preceding blocks.

The various features described above are merely non-limiting examples, and can be rearranged, combined, subdivided, omitted, and/or altered in any desired manner. For example, features of the servers can be subdivided among multiple processors and computing devices.

Any of the above-mentioned functional components may be implemented with at least one processor and at least one memory. The functional components may include hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of the components of FIG. 1 as described herein may be implemented, for example, by reading and executing such computer-readable instructions for performing those functions, and/or by any hardware subsystem (e.g., a processor) from which the computer is composed.

While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. A method comprising:
   establishing a session for delivery of:
      a first component of a multimedia content item; and
      a second component of the multimedia content item,
         wherein the first component and the second component each comprise a different one of video, audio, or data components of the multimedia content item;
   providing, during the session, the first component synchronized with the second component;
   monitoring network conditions, wherein the monitoring comprises comparing bandwidth utilization rates, for the session, to a bandwidth utilization rate threshold;
   determining an inactivity event during the session; and
   after determining the inactivity event:
      maintaining the session in an active state; and
      based on a bandwidth utilization rate, of the compared bandwidth utilization rates and for a time associated with the inactivity event, exceeding the bandwidth utilization rate threshold:
         causing delivery of the first component to be stopped; and
         continuing delivery of the second component while delivery of the first component has stopped.

2. The method of claim 1, further comprising:
   determining an activity event while the delivery of the first component has stopped; and
   resuming, after the determining the activity event and based on a timestamp associated with the second component, delivery of the first component.

3. The method of claim 1, further comprising:
   providing, during the inactivity event and instead of the first component, one or more screen shots,
   wherein the first component comprises the video component of the multimedia content item, and
   wherein the second component comprises the audio component of the multimedia content item.

4. The method of claim 1, further comprising, based on a first network event and before the inactivity event:
   determining a first timestamp associated with the first component; and
   providing, instead of the first component and based on the first timestamp, a different version of the first component.

5. The method of claim 4, further comprising, based on a second network event occurring after the first network event and before the inactivity event:
   determining a second timestamp associated with the different version of the first component; and
   providing, instead of the different version of the first component and based on the second timestamp, the first component.

6. The method of claim 4, wherein the first network event is based on a bandwidth utilization rate, of the compared bandwidth utilization rates and for a time before the inactivity event, satisfying a bandwidth utilization rate threshold value, and wherein the first component consumes more bandwidth than the second component.

7. A method comprising:
providing a plurality of components of a multimedia content item, wherein the plurality of components comprises an audio component and a video component;
monitoring network conditions, wherein the monitoring comprises comparing bandwidth utilization rates, for a session associated with delivery of the multimedia content item, to a bandwidth utilization rate threshold;
based on a first event occurring while providing the plurality of components and based on a bandwidth utilization rate, of the compared bandwidth utilization rates and for a time associated with the first event, exceeding the bandwidth utilization rate threshold:
causing delivery of the video component to be stopped; and
continuing to provide the audio component while delivery of the video component is stopped; and
based on a second event occurring while delivery of the video component is stopped:
determining a timestamp associated with the audio component or with the second event; and
resuming, based on the timestamp, delivery of the video component.

8. The method of claim 7, further comprising, based on a third event and before the first event:
determining a second timestamp associated with the video component; and
providing, instead of the video component and based on the second timestamp, a different version of the video component.

9. The method of claim 8, further comprising, based on a fourth event and before the first event:
determining a third timestamp associated with the different version; and
providing, instead of the different version and based on the third timestamp, the video component.

10. The method of claim 7, further comprising providing a screen shot while delivery of the video component is stopped.

11. The method of claim 7, wherein each of the first event and the second event comprises one or more of:
an event associated with a network condition;
an event associated with inactivity; or
an event associated with activity.

12. The method of claim 7, wherein the first event comprises a determination that a first graphical user interface presenting the video component and the audio component is at least partially obscured by a second graphical user interface.

13. The method of claim 7, wherein the first event comprises a determination that a user input has not been received for a period of time.

14. A method comprising:
providing a plurality of components of a multimedia content item, wherein the plurality of components comprises an audio component of the multimedia content item and a first version of a video component of the multimedia content item;
monitoring network conditions, wherein the monitoring comprises comparing bandwidth utilization rates, for a session associated with delivery of the multimedia content item, to a bandwidth utilization rate threshold;
based on a first event and based on a bandwidth utilization rate, of the compared bandwidth utilization rates and for a time associated with the first event, exceeding the bandwidth utilization rate threshold:
determining a first time associated with the first version; and
replacing the first version, based on the first time, with a second version of the video component of the multimedia content item; and
based on a second event:
determining a second time associated with the second version; and
replacing the second version, based on the second time, with the first version.

15. The method of claim 14, further comprising, based on a third event and while providing the first version:
causing delivery of the first version to be stopped; and
continuing to provide the audio component while delivery of the first version is stopped.

16. The method of claim 15, further comprising, based on a fourth event and while the delivery of the first version is stopped:
determining a third time associated with the audio component; and
resuming, based on the third time, delivery of the first version.

17. The method of claim 15, further comprising, based on a fourth event and while the delivery of the first version is stopped:
determining a third time preceding a time of the third event; and
resuming, based on the third time, delivery of the first version.

18. The method of claim 15, further comprising, based on a fourth event and while the delivery of the first version is stopped:
determining a time of the third event; and
resuming, based on the time of the third event, delivery of the first version.

19. The method of claim 14, wherein each of the first event and the second event comprises one or more of:
an event associated with a network condition;
an event associated with inactivity; or
an event associated with activity.

20. The method of claim 14, wherein the first event comprises a determination that a first graphical user interface presenting the first version and the audio component is at least partially obscured by a second graphical user interface.

21. The method of claim 1, wherein the continuing delivery of the second component while delivery of the first component has stopped comprises continuing delivery of:
a current data fragment, associated with a current time stamp of the multimedia content item and associated with the inactivity event, of the second component; and
further data fragments, associated with subsequent time stamps of the multimedia content item, after the current time stamp.

22. The method of claim 7, wherein the first event is based on user inattention to the multimedia content item, and wherein, based on the user inattention, delivery of the video component is stopped while delivery of the audio component continues.

23. The method of claim 7, further comprising providing a smaller window for display of another version of the video component while delivery of the video component is stopped.

24. The method of claim 14, wherein the first event is based on determining that output of the multimedia content item is at least partially obscured on a display; and wherein the second version of the video component comprises a lower quality version of the multimedia content item than the first version.

25. The method of claim 1, further comprising:

based on a bandwidth utilization rate, of the compared bandwidth utilization rates and for delivery of the second component, falling below the bandwidth utilization rate threshold, resuming delivery of the first component.

26. The method of claim 7, wherein the second event is based on a bandwidth utilization rate, of the compared bandwidth utilization rates and for providing the audio component falling below the bandwidth utilization rate threshold.

27. The method of claim 14, wherein the second event is based on a bandwidth utilization rate, of the compared bandwidth utilization rates and for providing the audio component, falling below the bandwidth utilization rate threshold.

28. The method of claim 1, wherein a bandwidth utilization rate, of the compared bandwidth utilization rates, comprises a network bandwidth utilization rate that is based on a number of components of the multimedia content item delivered to a computing device over a specified period of time.

29. The method of claim 14, wherein:

the first version of the video component of the multimedia content item comprises high definition video; and the second version of the video component of the multimedia content item comprises standard definition video.

30. The method of claim 1, wherein the determining the inactivity event comprises determining that a first graphical user interface presenting the video component of the multimedia content item and the audio component of the multimedia content item is at least partially obscured by a second graphical user interface.

31. The method of claim 1, wherein the determining the inactivity event comprises determining that a user input has not been received for a period of time.

32. The method of claim 1, wherein the determining the inactivity event comprises determining user inattention to the multimedia content item, wherein the first component comprises the video component and the second component comprises the audio component.

* * * * *

UNITED STATES PATENT AND TRADEMARK OFFICE
CERTIFICATE OF CORRECTION

| | | |
|---|---|---|
| PATENT NO. | : 11,277,353 B2 | |
| APPLICATION NO. | : 15/905298 | |
| DATED | : March 15, 2022 | |
| INVENTOR(S) | : Werner et al. | |

It is certified that error appears in the above-identified patent and that said Letters Patent is hereby corrected as shown below:

In the Specification

Column 5, Detailed Description, Line 54:
Delete "306C-D." and insert --308C-D.-- therefor In the Claims Column 15, Claim 26, Line 16:
After "component", insert --,--

Signed and Sealed this
Eighteenth Day of July, 2023

Katherine Kelly Vidal
*Director of the United States Patent and Trademark Office*